United States Patent [19]

Allisio

[11] Patent Number: 4,519,470
[45] Date of Patent: May 28, 1985

[54] SELF-PROPELLED UNIT FOR PROPELLING A PERSON WEARING SNOW SKIS ALONG A RISING SNOW PATH

[76] Inventor: Giovanni Allisio, Vicolo Lucinicco, 6, Rivoli, Torino, Italy

[21] Appl. No.: 480,135

[22] Filed: Mar. 29, 1983

[51] Int. Cl.³ .............................................. A63C 5/08
[52] U.S. Cl. ...................................... 180/180; 180/9.4
[58] Field of Search .............. 180/180, 181, 190, 9.22, 180/9.24, 9.4, 19 R

[56] References Cited

U.S. PATENT DOCUMENTS

| | | | |
|---|---|---|---|
| 1,694,671 | 12/1928 | Rodelli | 180/181 |
| 3,750,777 | 8/1973 | Thompson | 180/180 |
| 3,797,446 | 3/1974 | Cox et al. | 180/180 |
| 3,826,323 | 7/1974 | Mehne | 180/180 |

FOREIGN PATENT DOCUMENTS

| | | | |
|---|---|---|---|
| 499819 | 2/1954 | Canada | 180/180 |
| 2431304 | 2/1980 | France | 180/9.22 |
| 479495 | 3/1953 | Italy | 180/180 |
| 1042943 | 9/1966 | United Kingdom | 180/180 |

*Primary Examiner*—David M. Mitchell
*Attorney, Agent, or Firm*—Young & Thompson

[57] ABSTRACT

A self-propelled unit (3), usable by a skier for moving along a rising snow path, comprises a frame (7), rolling structure (12) for the movement of the self-propelled unit (3) along the snow, an engine (20) for driving the rolling structure (12), a transmission (21, 25) which connects the engine (20) to the rolling structure (12), and a control (4) for the engine (20). The self-propelled unit (3) is of such dimensions and weight as to be portable. It is also provided with structure (14 and 34) for the releasable connection of the frame to the skis (2) and sticks (37) of the skier. This connection (14 and 34) is configured in such a manner that a large part of the weight of the skier acts on the self-propelled unit.

9 Claims, 7 Drawing Figures

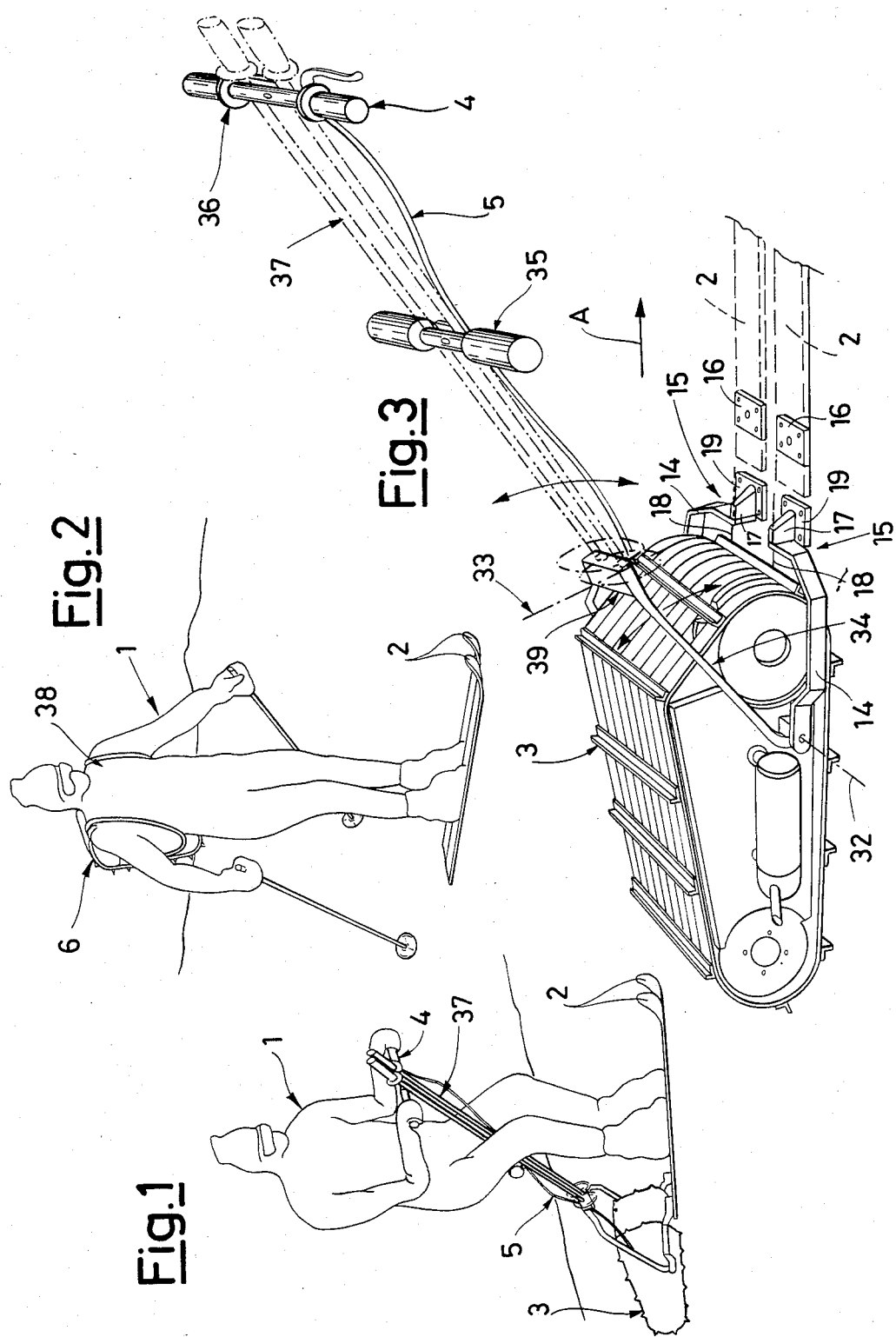

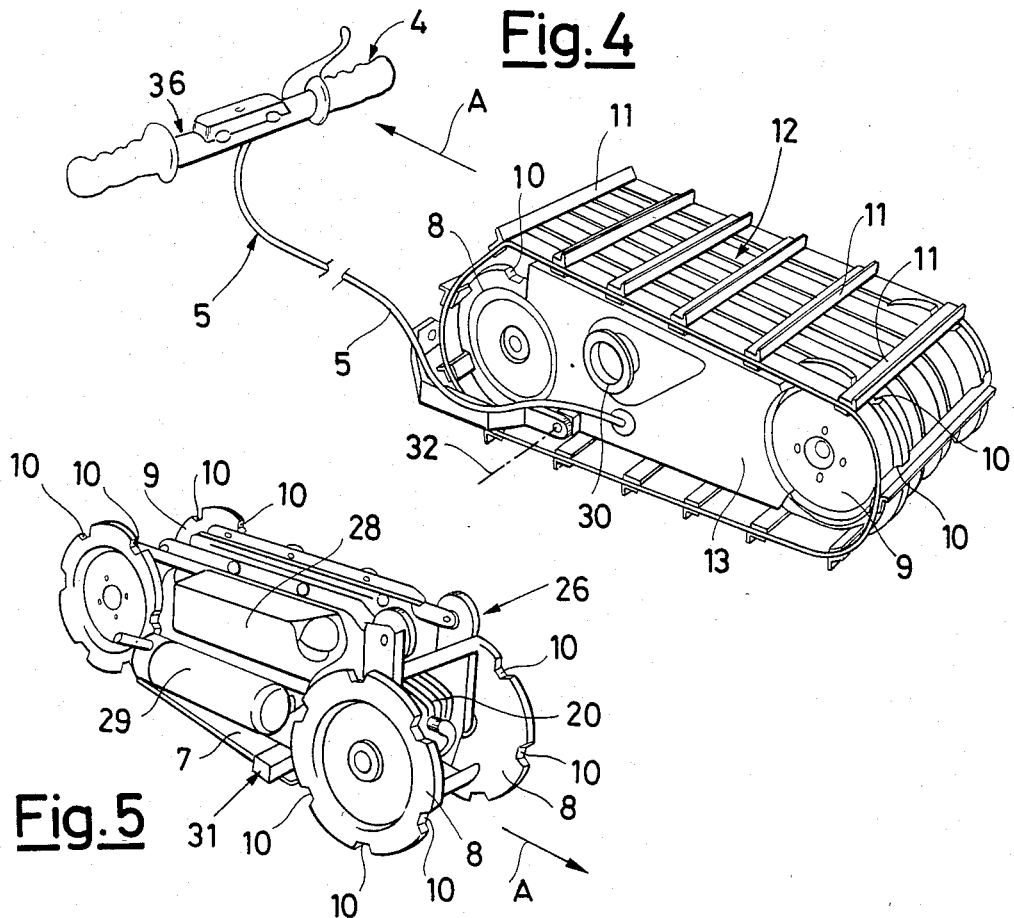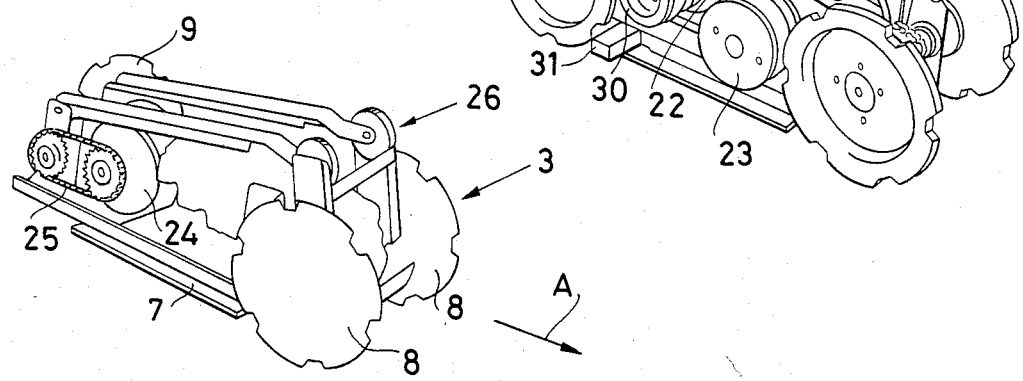

SELF-PROPELLED UNIT FOR PROPELLING A PERSON WEARING SNOW SKIS ALONG A RISING SNOW PATH

DESCRIPTION

This invention relates to a self-propelled unit able to propel a person wearing snow skis along a rising snow path, comprising a frame, rolling means for the movement of the self-propelled until along the snow, an engine for driving the rolling means, a transmission which connects the engine to the rolling means, and engine control means.

Self-propelled units of the aforesaid type for use by a skier in overcoming a rising path are already available commercially. The types proposed up to the present time are however in the form of actual vehicles of considerable weight and overall size, and of high cost.

The main characteristic of the self-propelled unit according to the invention is that it is of such dimensions and weight as to be portable, and that said self-propelled unit is also provided with means for its releasable connection to the skis and sticks of the skier, said connection means being configured in such a manner that a large part of the skier's weight acts on the self-propelled unit.

By virtue of these characteristics, the self-propelled unit according to the invention can be advantageously used by a skier in order to overcome an upward snow path, after which it can be carried on the shoulders and conveyed downhill during the next descent on the skis.

Further characteristics and advantages of the present invention will be apparent from the description given hereinafter with reference to the accompanying drawings provided by way of non-limiting example, in which:

FIG. 1 shows the self-propelled unit according to the invention while in use during the upward movement of the skier, FIG. 2 shows the skier during his descent, and FIGS. 3 to 7 are perspective views showing a preferred embodiment of the self-propelled unit according to the invention.

FIG. 1 shows a skier 1 wearing snow skis 2 during upward movement. This movement is obtained by the self-propelled unit according to the present invention, in the manner described in detail hereinafter. In FIG. 1, the self-propelled unit is indicated overall by the reference numeral 3. This unit is controlled by the skier by means of a handle 4 connected to the ski sticks 37 and by means of a bundle of flexible cables 5 connected to the unit 3.

At the end of his ascent, the skier separates the self-propelled unit 3 from the skis 2 and sticks 37, and straps it as shown at 6 (FIG. 2) by means of strap 38 with which the unit is provided, so that he can carry it on his shoulders during his subsequent descent on the skis.

With reference to FIGS. 3 to 7, which illustrate a preferred embodiment of the self-propelled unit according to the invention, said unit comprises a frame 7 (see FIG. 5) on which a pair of front wheels 8 and a pair of rear wheels 9 are rotatably mounted. The wheels 8, 9 comprise peripheral recesses 10 in which the ends of transverse bars 11 (see FIG. 4) forming part of a crawler track 12 engages.

The self-propelled unit comprises two lateral protection walls 13 screwed to the frame 7 (see FIGS. 3, 4), and from which there project two lateral supports 31 which are fixed to the frame (see FIGS. 5, 6). On the supports 31 there are mounted, rotatable about a transverse axis 32 (see FIGS. 3, 4), two brackets 14 projecting frontwards from the self-propelled unit, and the arms of a fork 34 which are joined at a plate 39 (see FIG. 3) which is designed for rapid releasable fixing to both the lower parts of the ski sticks 37 (see FIG. 3) so that the sticks are able to swivel about an axis 33 orthogonal to the axis 32. The free ends of the brackets 14 each comprise an articulated connection unit 15 (see FIG. 3) designed for releasable fixing, for example by means of a bayonet or instant insertion connection, to a corresponding connection plate 16 situated on the rear end of the ski 2. Each articulated connection unit 15 enables a support 17 to rotate relative to the bracket 14 about a longitudinal horizontal axis 18, and enables a plate 19 (to be fixed to the plate 16) to rotate relative to the support 17 about a vertical axis.

Because of this arrangement, when the articulated connection units 15 are connected to the skis 2, and the plate 39 is connected to the sticks 37, a large part of the skier's weight acts on the self-propelled unit 3 because of the rigid connection constituted by the connection brackets 14 and support 34, and at the same time the skis 2 and sticks 37 are given the necessary freedom to enable the direction of movement to be controlled and any necessary edging to be undertaken.

On the drawings, the arrow A indicates the direction of movement of the self-propelled unit according to the invention, which as stated heretofore is in the form of a crawler-tracked unit, in the illustrated embodiment.

An internal combustion engine of small piston displacement, indicated by 20 in FIG. 5, is mounted on the frame 7 of the self-propelled unit in a forward position between the two front wheels 8.

The shaft of the engine 20 is connected to the rear wheels 9, which act as drive wheels, by a transmission including an automatic clutch of known type used for example in mopeds (indicated by 21 in FIG. 6). By means of a belt 22, the clutch 21 controls an automatic transmission 23, which is also of known type used for example in mopeds.

A drum brake 24 (see FIG. 7) is mounted on the shaft of the automatic transmission 23. This shaft is also connected by a chain transmission 25 to the shaft of the rear wheels 9.

On the drawings, the reference numeral 26 indicates overall a device for adjusting the crawler track tension. In FIG. 5, the reference numerals 28 and 29 indicate respectively the fuel tank and exhaust silencer of the internal combustion engine.

Finally, in FIG. 6 the reference numeral 30 indicates a pulley about which a cable is wound for starting the engine (see also FIG. 4).

When the skier wishes to ascend, he connects the connection ends of the brackets 14 to the skis 2 and the central part 39 of the support 34 to the sticks 37, on which the seat 35 and the control handle 36 are mounted by means of screws, after which he starts the engine 20 by means of the pulley 30. The handle 4 includes a member for adjusting the engine rotational speed. As the rotational speed increases, the automatic clutch 21 gradually transmits the torque from the engine to the wheels. The automatic transmission 23 sets the optimum transmission ratio at all times in relation to the load conditions and the slope of the path.

A self-propelled unit of the type heretofore described can enable the skier to overcome ascents up to a maximum slope of 40% at a maximum speed of about 20 km per hour.

In order to slow down, the brake 24 is operated by means of the handle 4.

In the example heretofore described, direction changes are made by the usual method in skiing, namely shifting the weight of the skier from one ski to the other. Along a path of small slope, the articulated connection units 15 enable the skis to be tilted on to their front edge, while the self-contained unit remains in contact with the ground.

The handle 4 also includes a control for stopping the engine.

Within the principle of the invention, the constructional details and shape embodiments can be widely modified relative to that described and illustrated by way of example, without leaving the scope of the present invention.

For instance, an electric motor could be used instead of an internal combustion engine.

It is also possible to provide a self-contained unit comprising for example two crawler-tracked means designed for connection laterally to the skis and arranged to be controlled separately in order to obtain a more precise control of the direction of movement.

Furthermore, instead of using a crawler track, movement along the snow could be obtained by a series of wheels or by one or more rotating propellers which grip the snow surface.

A crawler track could also be used which does not pass around the entire structure of the machine, but which instead is disposed below said structure. In this case, the structure could be protected by cover walls. Moreover, the wheels on which the track engages could be rubber wheels instead of toothed wheels.

Finally, the self-propelled unit according to the invention can also be applied in general to vehicles fitted with snow skis or skids in order to propel them.

In a further embodiment (not shown), the self-propelled unit can be arranged in another manner, for example not directly connected to the skis, so allowing the skier greater freedom of movement. Alternatively, in a simplified embodiment the skier can be connected to the self-propelled unit only by way of the skis, so remaining upright and holding not only the sticks but also a handle for controlling the unit, which is connected to it by flexible conductors.

I claim:

1. A self-propelled unit for propelling a person wearing snow skis along a rising snow path, comprising a frame (7), rolling means (12) for the movement of the self-propelled unit (3) along the snow, an engine (20) for driving the rolling means (12), a transmission (21 to 25) which connects the engine (20) to the rolling means (12), and control means (4) for the engine (20), characterised in that said self-propelled unit is of such dimensions and weight as to be portable, and is provided with rigid means for its releasable connection to the rear ends of the skier's skis (2) to push the skis forward with said unit disposed to the rear of the skis.

2. A self-propelled unit as claimed in claim 1, characterised by being also provided with means (34) for its releasable connection to the ski sticks (37).

3. A self-propelled unit as claimed in claim 1, characterised in that the engine (20) is an internal combustion engine.

4. A self-propelled unit as claimed in claim 1, characterised in that the rolling means are constituted by a crawler track (12).

5. A self-propelled unit as claimed in claim 1, characterised in that said transmission includes an automatic clutch (21) and an automatic transmission (23).

6. A self-propelled unit as claimed in claim 1, characterised by comprising a drum brake (24).

7. A self-propelled unit as claimed in claim 1, characterised in that the control means comprise a control handle (4) connected by a bundle (5) of flexible cables to the self-propelled unit (3).

8. A self-propelled unit as claimed in claim 1, characterised in that said releasable connection means comprises two lateral brackets (14) on said frame (7) projecting forwards and provided at their free ends with articulated connection units (15) for their connection to the skis (2), said articulated connection units (15) being arranged to allow rotation about a longitudinal horizontal axis (18) and about a vertical axis.

9. A self-propelled unit as claimed in claim 3, characterised in that the crawler track (12) includes a series of transverse bars (11), of which the ends engage in the recesses (10) of a pair of front wheels (8) and a pair of rear wheels (9).

* * * * *